United States Patent
Burrows et al.

[15] 3,648,229
[45] Mar. 7, 1972

[54] PULSE CODED VEHICLE GUIDANCE SYSTEM

[72] Inventors: Alan A. Burrows, Orange; Henry C. Lehde, Westminister, both of Calif.

[73] Assignee: McDonnell Douglas Corporation

[22] Filed: Mar. 23, 1970

[21] Appl. No.: 21,820

[52] U.S. Cl. ................................................................340/26
[51] Int. Cl. .........................................................G08g 5/00
[58] Field of Search ..............................340/25, 26; 356/25, 26

[56] References Cited

UNITED STATES PATENTS

| | | | |
|---|---|---|---|
| 3,191,146 | 6/1965 | Mitchell | 340/26 |
| 3,158,834 | 11/1964 | Evans | 340/25 |
| 3,311,877 | 3/1967 | Projector et al. | 340/25 |
| 3,377,617 | 4/1968 | Projector | 340/25 |
| 3,447,129 | 5/1969 | Birmingham et al. | 340/29 |

Primary Examiner—Kathleen H. Claffy
Assistant Examiner—David L. Stewart
Attorney—Walter J. Jason, Donald L. Royer and D. N. Jeu

[57] ABSTRACT

Vehicle guidance system including means for projecting a beam of light to guide a vehicle such as an aircraft, and means for pulse coding the normally lower and upper portions of the beam whereby pulse coded signals are encountered by the aircraft following the beam on any departure into the pulse coded portions. The lower and upper pulse coded portions of the beam are differentiated by frequency and/or color coding. The duration of the pulses is also preferably varied in accordance with the degree of aircraft departure into the pulse coded portions of the beam.

17 Claims, 25 Drawing Figures

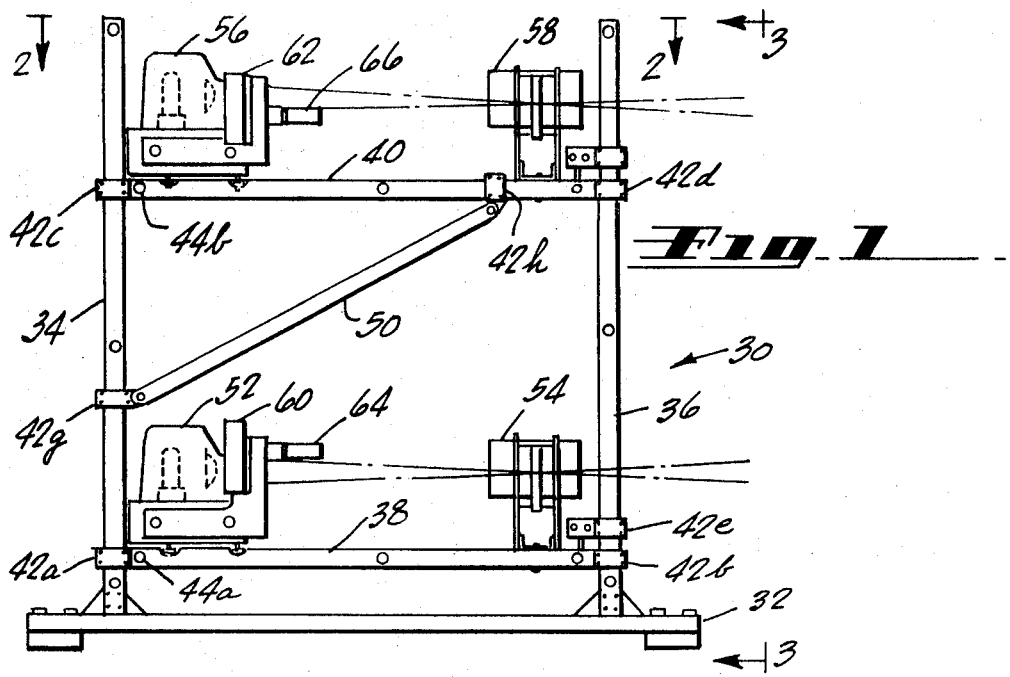
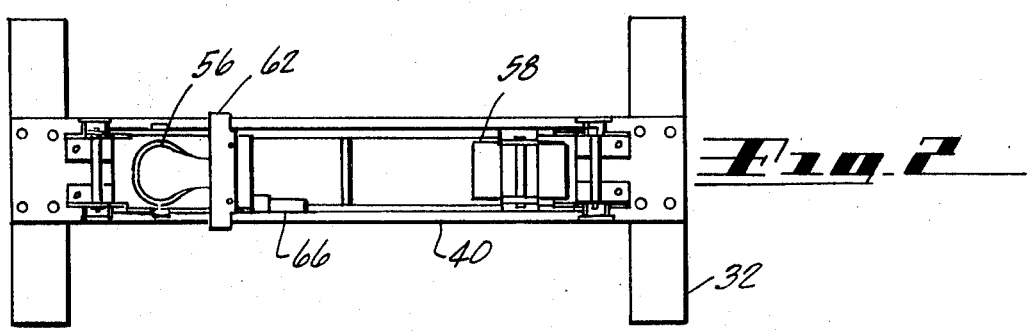
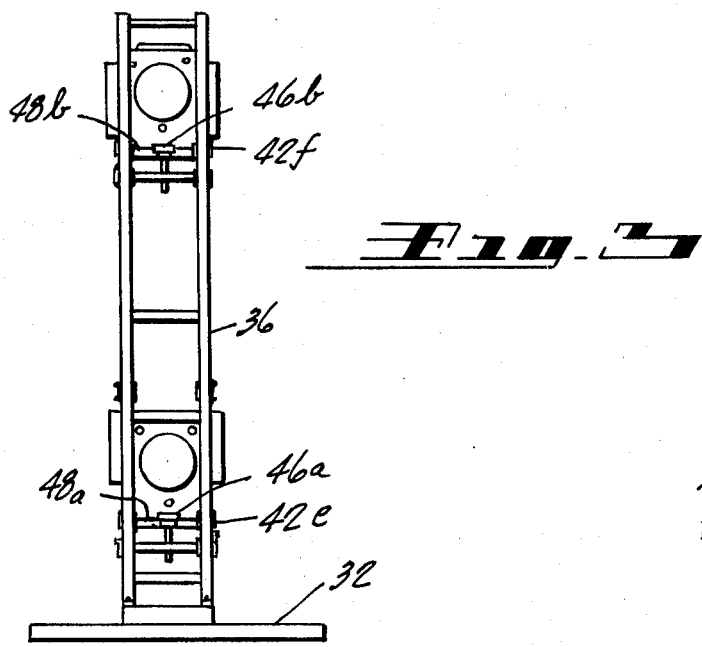

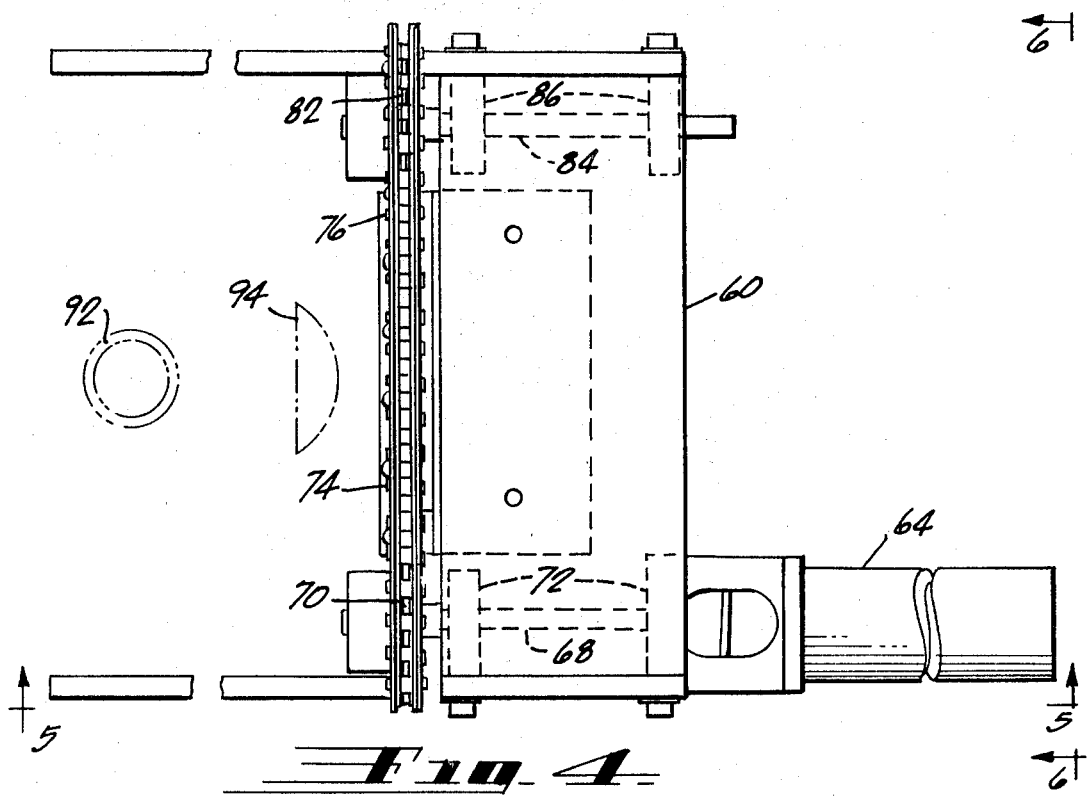
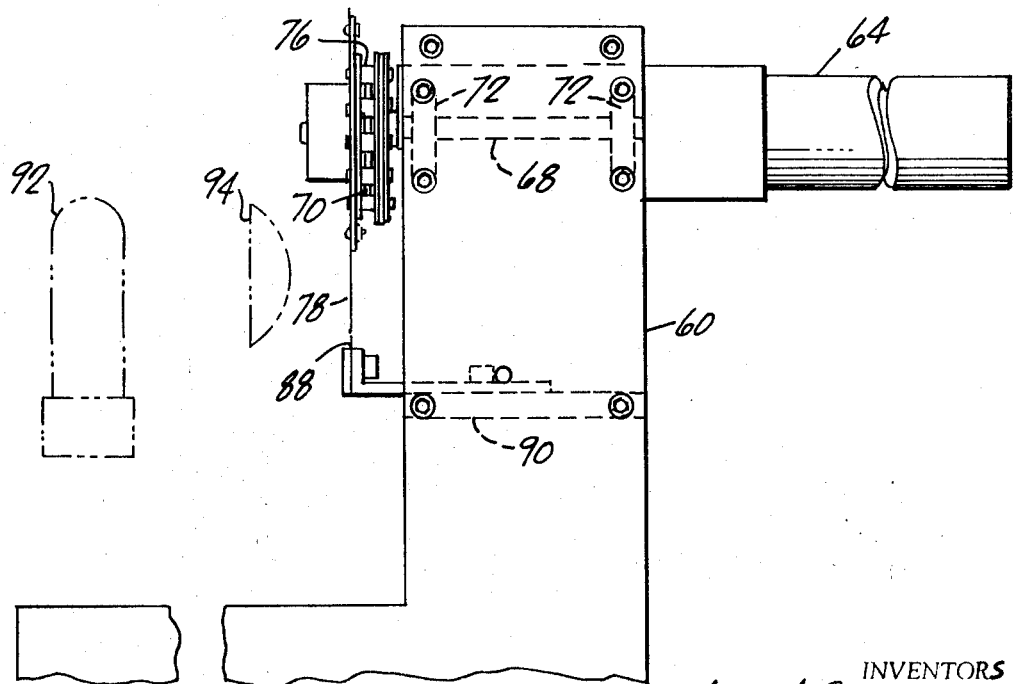

INVENTORS
ALAN A. BURROWS
HENRY C. LEHDE

BY

— AGENT —

INVENTORS
ALAN A. BURROWS
HENRY C. LEHOE

BY
—AGENT—

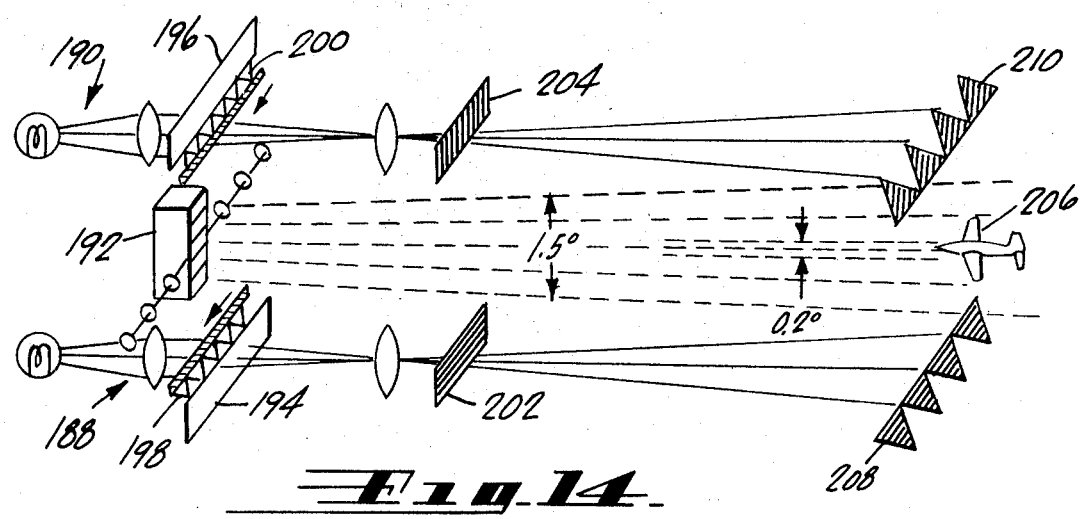
Fig. 14
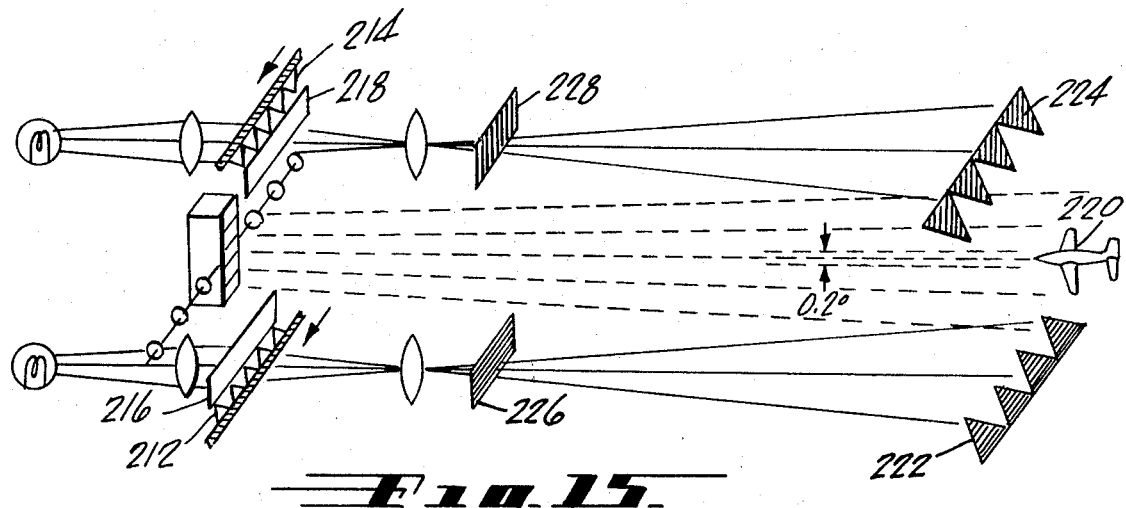
Fig. 15
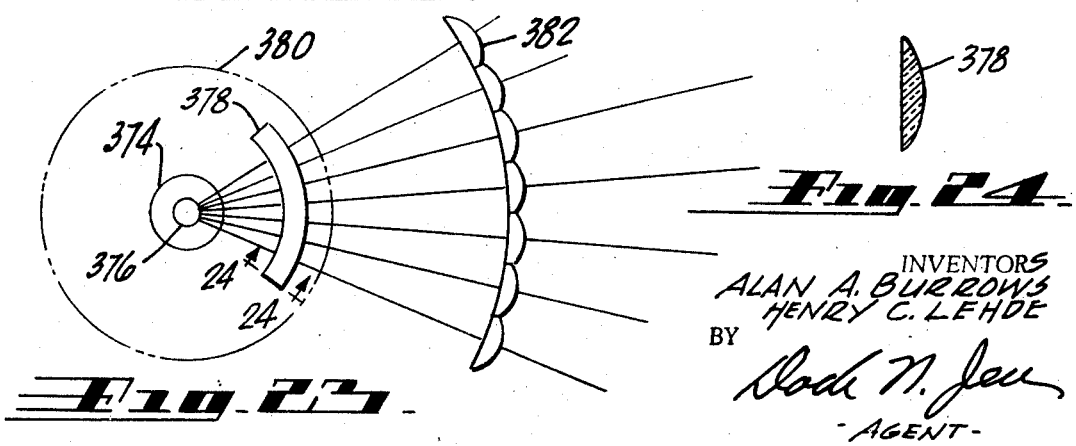
Fig. 23
Fig. 24
INVENTORS
ALAN A. BURROWS
HENRY C. LEHDE
BY
AGENT

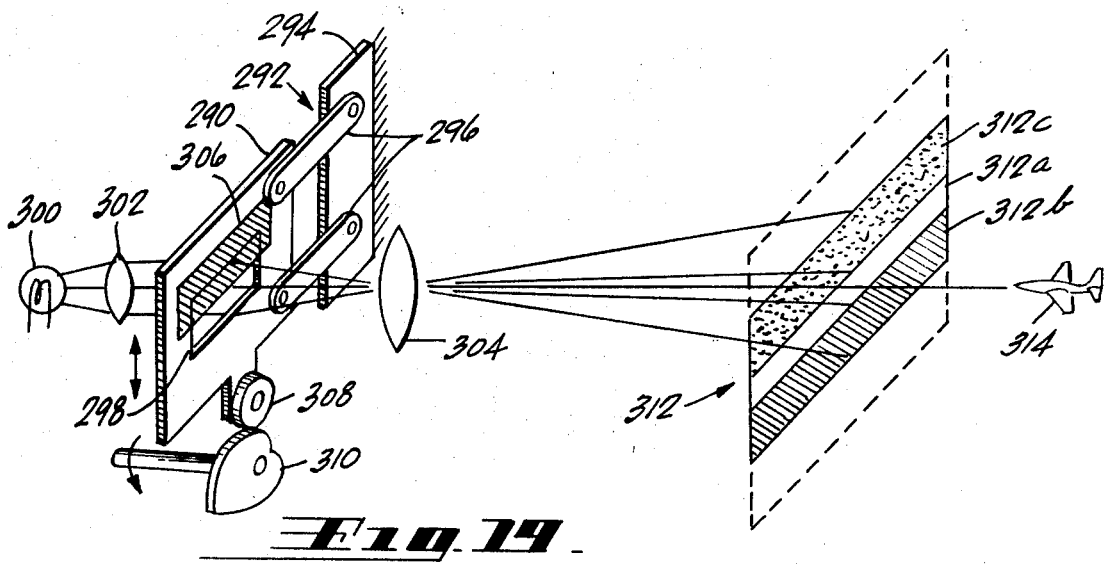
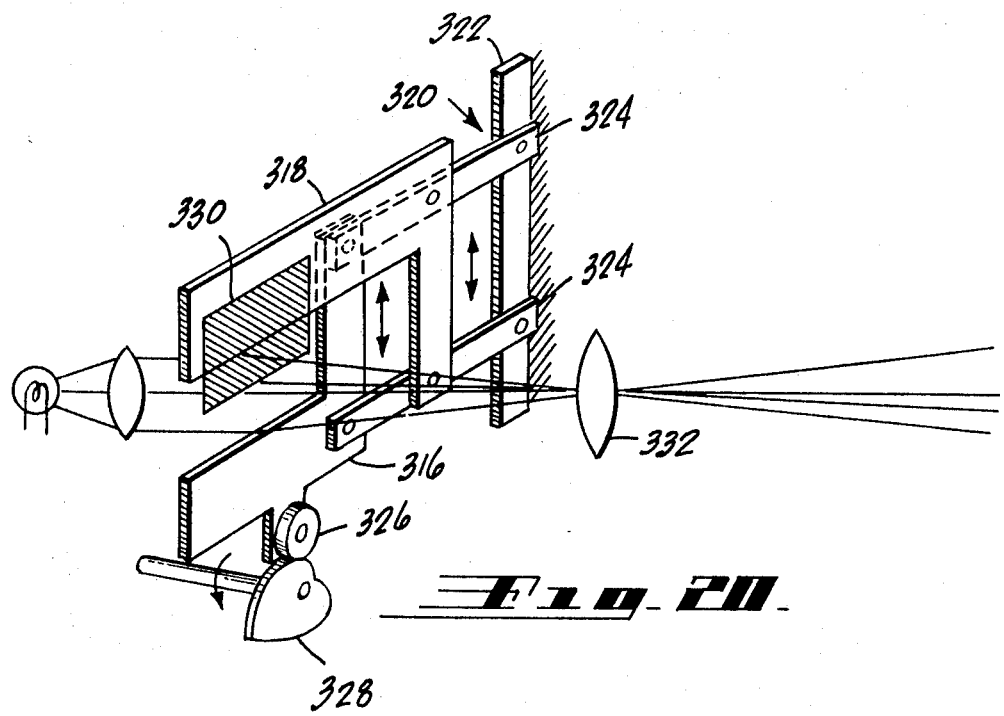

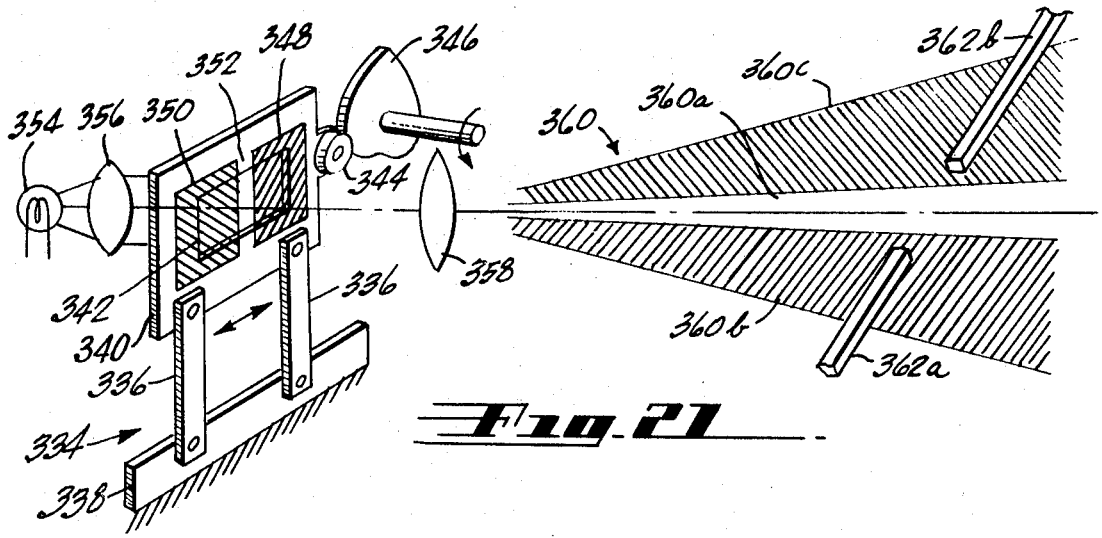
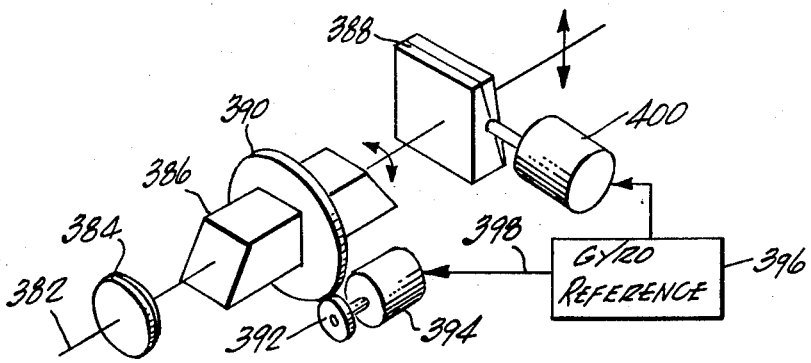
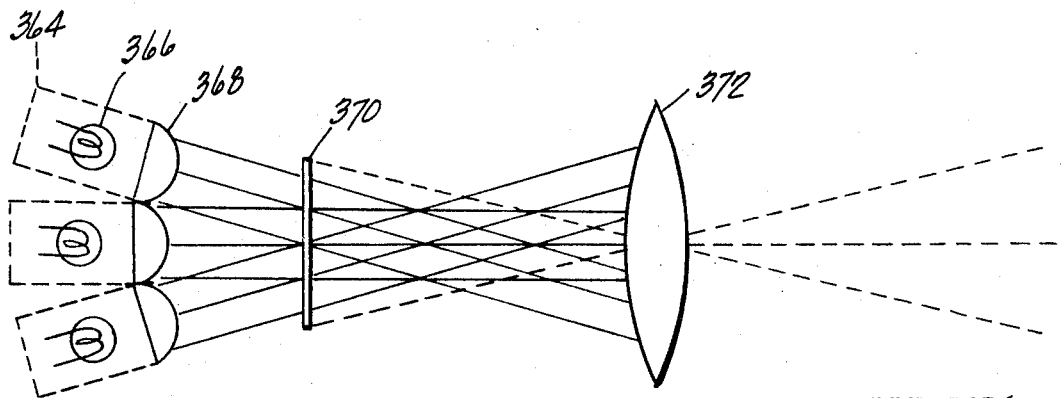

PULSE CODED VEHICLE GUIDANCE SYSTEM

BACKGROUND OF THE INVENTION

Our present invention relates generally to vehicle guidance systems and more particularly to an aircraft landing aid that employs projected beams of light to define a glide slope or path along which a pilot may direct his aircraft in order to touch down at a specific area on a runway for a proper and safe landing.

One type of aircraft landing aid that is an optical system designed to provide information concerning an aircraft's position relative to a proper or optimum glidepath is commonly known as the Fresnel lens optical landing system. The Fresnel system now in use normally includes a vertical stack of five main source light cells with Fresnel lenses each projecting a wedge-shaped beam of light through the sky. A series of green datum or reference lights is positioned in a horizontal row six on each side of the center cell. The operation of the system is based on the pilot detecting which wedge-shaped beam of light he is in by comparing the vertical position of an amber ball of light, called the "meatball," seen in the Fresnel lens stack with respect to the horizontal row of datum lights. The apparent vertical movement of the amber ball of light in the Fresnel lens stack relative to the horizontal row of datum lights is an indication of aircraft deviation above or below the proper or optimum glide path.

The amber ball of light (meatball) seems to the pilot to move as a function of the angular error of his aircraft with respect to the desired path. If the aircraft is high with respect to the optimum glidepath, the amber ball of light will be displaced so that it appears as though it is raised above a line passing through the centers of the datum lights arranged in a horizontal row. The higher the aircraft rises above the optimum glidepath, the higher the meatball is displaced. Similarly, if the aircraft is low relative to the optimum glidepath, the meatball will be displaced below the horizontal row of datum lights. When the aircraft is very low with respect to the optimum glidepath, such as two meatballs low (i.e., the center of the meatball is apparently displaced two meatball diameters below the line passing though the centers of the horizontal datum lights), the meatball color changes from amber to red in the usual Fresnel system.

Since the Fresnel lens of each source light cell actually transmits a wedge-shaped beam of light which increases (expands) in cross-sectional area with distance from the cell, the meatball response sensitivity changes as a function of aircraft distance from the Fresnel lens stack display. Accordingly, smaller control stick or wheel movements are required when the aircraft is closer to the display in order to provide an equivalent change in meatball position. While the Fresnel system provides a direct quantitive display of glidepath deviation and involves no problems in interpretation, it is limited to an effective range of approximately 1 mile or less by practical limitations on the size of the Fresnel lens stack display and by the visual acuity of the pilot. The effective range is, of course, reduced by fog, haze or adverse lighting conditions.

At distances of about 1 mile, however, small excursions of the source light (meatball) relative to the horizontal datum lights (reference line) are very difficult for the pilot to discern. The result is that the pilot cannot acquire and maintain a meatball lined up perfectly with the datum lights and thus settle accurately on the optimum glidepath until he is close enough to see the display signal well. That is, the error signal transmitted changes in quality as a function of distance. More importantly, the pilot's inability to detect small signal changes severely limits any rate or higher order information he might obtain to establish how fast he may be moving towards or away from the optimum glidepath. Better than zero-order error information is necessary and essential for maintaining aircraft longitudinal stability during the landing approach, as is well known.

Many attempts have been made to rectify or solve the problem. The so-called Rainbow and Depth-of-Flash systems have, for example, been developed from these attempts. In the Rainbow system, the pilot is provided with an approach path to follow in order to make an asymptotic merging with the optimum glidepath. The approach information is provided by changing the color sequence of light emanating from a single light source. Thus, one color sequence would tell the pilot to decrease his rate of descent while another sequence would tell him to increase the rate, and a steady light would tell him that he was proceeding properly. In this system, the pilot was in effect left attempting to follow an exponentially shaped glidepath which did little to simplify his task. Reversals in the interpretation of color sequencies can also occur. In addition, a selective variation in attenuation of colors is caused by atmospheric and meteorological conditions.

In the Depth-of-Flash system, while there are several variations thereof, the basic concept is that when the aircraft is on or close to the optimum glidepath, the pilot sees a steady white (or steady amber) light which turns into a colored light that begins to flash more and more perceptibly or vigorously as the error from the glide path increases. For example, as the pilot approaches the optimum glide path from above, the pilot sees a flashing green light which gradually appears to lose its flashing characteristic and becomes a steady green just before he reaches the glidepath, at which time the light appears to turn steady while (or steady amber). Similarly, if the pilot goes slightly below the optimum glide path, he will see a steady red light which becomes a deeply flashing red as he goes considerably below the glide path. Light intensity is varied as a result of position change with respect to the glidepath. In this system, the pilot receives uncertain information when operating through patchy fog (clouds) or under thermally disturbed atmospheric conditions. Further, a change in light intensity does not create a signal which is as conspicuous and penetrating as complete interruption of the light, which also results in no change in visibility over the entire signal pattern. Estimation of a change in relative light intensity is less accurate than estimation of a change in the relative time duration of a pulse of light. This is particularly true when the compared light intensities are both increasing rapidly as the aircraft approaches the runway. Perception of sequential time duration signals is affected by intensity variations (incurred by atmospheric changes, for example) to a much lesser extent than the perception of amplitude sequential signals which are similarly affected by such variations.

With the increasing speed of new types of aircraft, an increase in the range of acquisition of the optimum glide path is desirable. This is particularly true on, for example, aircraft carriers where precisely controlled landings must be made to ensure that the tail hook of a landing aircraft will properly engage an arresting cable on the carrier's deck. While the Fresnel system gives a direct quantative signal suitable for optimum glide path acquisition at distances up to about a mile, it is increasingly important to get established on the glidepath before reaching this range, especially with the higher speed aircraft, so that more attention can be given to other landing problems.

SUMMARY OF THE INVENTION

Briefly, and in general terms, our invention is preferably accomplished by providing a vehicle guidance system including means for projecting a beam of light to guide a vehicle such as an aircraft, and means for pulse coding the normally lower and upper portions of the beam whereby pulse coded signals are encountered on any deviation or departure by the aircraft traveling along the beam into the pulse coded portions thereof. The lower and upper pulse coded portions of the beam can be differentiated by frequency and/or color coding. Further, the pulse duration in each period of the pulse coded signals can be varied in accordance with the amount or degree of departure of the aircraft into the pulse coded portions of the beam. Different embodiments of the pulse coding means including moving sawteeth chain, stationary sawteeth template and reciprocating shutter configurations can be used. This pulse code system can also be combined with a conventional Fresnel system to extend greatly the effective range of optical guidance for the aircraft.

BRIEF DESCRIPTION OF THE DRAWINGS

Our invention will be more fully understood, and other features and advantages thereof will become apparent, from the following description of certain exemplary embodiments of the invention. The description is to be taken in conjunction with the accompanying drawings, in which:

FIG. 1 is a side elevational view of a prototype of the invention wherein an experimental mounting setup is utilized;

FIG. 2 is a top plan view of the prototype as taken along the line 2—2 indicated in FIG. 1;

FIG. 3 is a frontal elevational view of the prototype as taken along the line 3—3 indicated in FIG. 1;

FIG. 4 is a top plan view of the chain drive mechanism for the lower projector of the prototype shown in FIG. 1;

FIG. 5 is a side elevational view of the chain drive mechanism as taken along the line 5—5 indicated in FIG. 4;

FIG. 14 is a fragmentary and diagrammatic perspective view of an optical guidance arrangement of pulse code and Fresnel systems wherein pulse coded signals are received by an aircraft only when outside of the approach space covered by the Fresnel system;

FIG. 15 is a fragmentary and diagrammatic perspective view of a variation of the optical guidance arrangement shown in FIG. 14;

FIG. 19 is a fragmentary and diagrammatic perspective view of a pulse code system including a single cam-operated shutter mounted on a parallelogram support structure for coding different portions of a projected light beam;

FIG. 20 is a fragmentary and diagrammatic perspective view of a pulse code system including two cam-operated shutters mounted on a double parallelogram support structure for coding different portions of a projected light beam;

FIG. 21 is a fragmentary and diagrammatic perspective view of a pulse code system similar to that of FIG. 19 for coding different portions of a projected light beam, but arranged to establish a linear path of travel for a ship or a land vehicle;

FIG. 22 is a top plan view of a condenser and projector lens arrangement for projecting a pulse coded light beam over a wide angular span;

FIG. 23 is a top plan view of a condenser and projector lens arrangement which permits the projection of pulse coded light over an unlimited horizontal span;

FIG. 24 is a cross-sectional view of the arcuate cylindrical condenser lens shown in FIG. 23, as taken along the line 24—24; and FIG. 25 is a fragmentary perspective view, shown partly in diagram form, of a gyrocontrolled optical system which can be used with the pulse code system mounted on an aircraft carrier to maintain its projected light beam in a fixed orientation regardless of the rolling and pitching motions of the carrier.

DESCRIPTION OF THE PRESENT EMBODIMENTS

Figure 6:
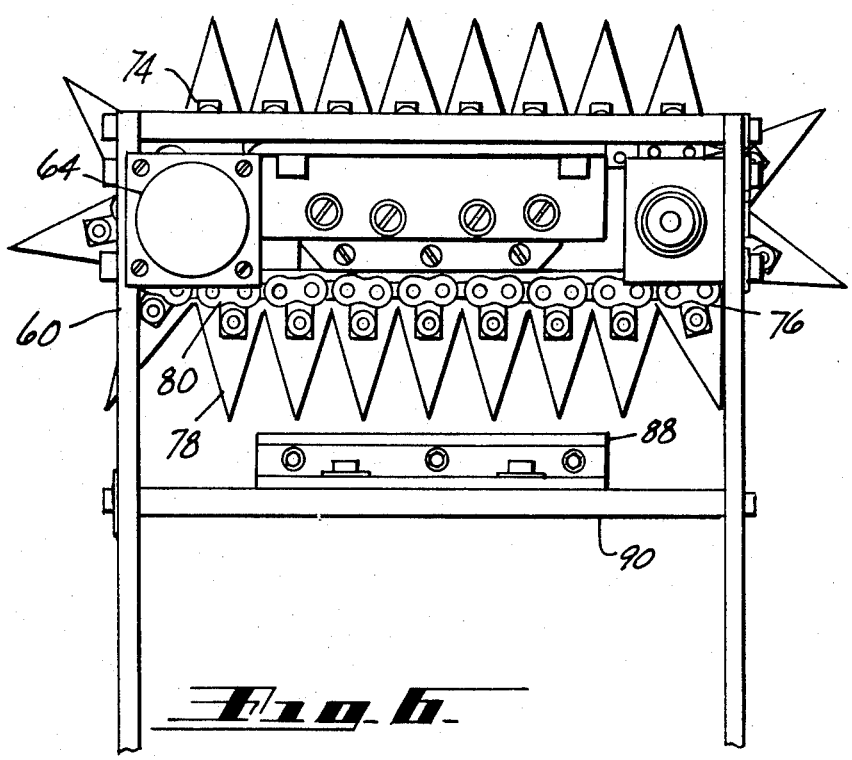
FIG. 6 is a frontal elevational view of the chain drive mechanism as taken along the line 6—6 indicated in FIG. 4.

FIGS. 1, 2 and 3 are side elevational, top plan and frontal elevational views of a prototype of our invention wherein an experimental mounting setup 30 is utilized. The mounting setup 30 includes a base 32, aft and forward vertical frames 34 and 36 attached at their lower ends to the base, and lower and upper horizontal frames 38 and 40 supported at their ends by adjustable pairs of channel clamps 42a, 42b, 42c and 42d which are secured to the aft and forward vertical frames. The clamp pair 42a is tightly secured to the aft frame 34 and connects with the left end of the lower frame 38 through pivot pin 44a. The clamp pair 42b is suitably connected to the right end of the lower frame 38 but is not normally secured tightly to the forward frame 36 to permit tilt adjustment of the lower frame. This is accomplished by tilt adjustment means 46a (FIG. 3) which is supported by a bracket 48a attached to clamp pair 42e that is tightly secured to the forward frame 36.

Similarly, the clamp pair 42c is tightly secured to the aft frame 34 and connects with the left end of the upper frame 40 through pivot pin 44b. The clamp pair 42d is suitably connected to the right end of the upper frame 40 but is not normally secured tightly to the forward frame 36 to permit tilt adjustment of the upper frame. This is accomplished by tilt adjustment means 46b which is supported by a bracket 48b attached to clamp pair 42f that is tightly secured to the forward frame 36. A brace 50 for the upper frame 40 is connected to the aft frame 34 and the upper frame by clamp pairs 42g and 42h, respectively, as shown in FIG. 1. The overall height and length of the mounting setup is about 5 by 5 feet, for example.

A projector 52 and its lens assembly 54 are suitably mounted on the lower frame 38, and another projector 56 and its lens assembly 58 are suitably mounted on the upper frame 40. The projectors 52 and 56 are readily interchangeable between the lower and upper frames 38 and 40 and are, for example, standard 1,200-watt Selectroslide projectors which have been suitably modified. The lens assemblies of the standard projectors were removed and replaced by the separate lens assemblies 54 and 58 which are movably adjustable along their respective horizontal frames 38 and 40. The slide mechanism of each of the standard projectors was also removed and replaced by a sawtooth chain drive mechanism.

Each of the lens assemblies 54 and 58 mounts a lens which has a focal length of 500 mm. and a diameter of 69.2 mm., for example. Each lens projects a sawtooth image having a vertical span of approximately 3.5° and a horizontal span of approximately 6.5°. These prototype span values can, of course, be easily changed by redesigning the optical elements. It may be desirable to decrease the vertical span to 2° and to increase the horizontal span to approach the usual 45° of the Fresnel beam. The sawtooth chain drive mechanisms 60 and 62 include respective drive motors 64 and 66 which can be varied in output speed to permit variation of the coded flash frequency produced by the sawteeth on each driven chain. The frequencies of pulse coding used in the experimental setup 30 were two cycles per second for an aircraft high indication and 4 cycles per second for the low indication, for example.

FIGS. 4, 5 and 6 are top plan, side elevational and frontal elevational views of the chain drive mechanism 60 for the lower projector 52. The chain drive mechanism 62 for the upper projector 56 is, of course, similar to the mechanism 60 except that it is inverted. The mechanism 60 includes a drive motor 64 (FIG. 4) which is suitably coupled to shaft 68 mounting a drive sprocket 70. The shaft 68 is, of course, suitably supported on bearings 72. The sprocket 70 engages sawtooth chain assembly 74 which includes an endless link chain 76 and sawteeth 78 (FIG. 6) attached to respective links 80 of the chain. The mechanism 60 further includes an idler sprocket 82 (FIG. 4) which also engages the chain 76 and is mounted on a rotatable shaft 84 that is suitably supported on bearings 86. Thus, the chain 76 is supported by the sprockets 70 and 82, and driven by motor 64 which is coupled to the drive sprocket 70.

The sawteeth 78 can be made of thin sheet metal and have a triangular planform or waveform as shown in FIG. 6. A mask assembly 88 is attached to spacer plate 90 and establishes the horizontal lower limit or boundary of the light transmitted between the sawteeth 78. The tips of the sawteeth 78 are moved horizontally adjacent closely to the fixed upper edge (FIG. 5) of the mask. A projected sawtooth light pattern is produced by the light emanating from lamp 92 and passing through condenser lens 94 to provide suitably intense light between the sawteeth 78 and above mask assembly 88.

Figure 7:
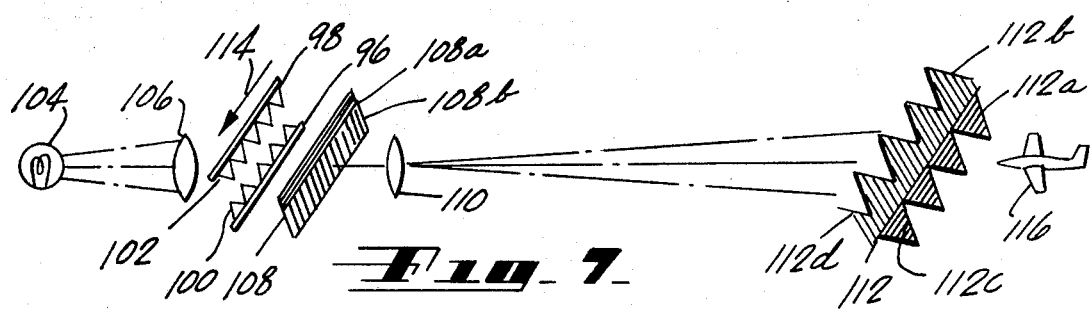
FIG. 7 is a fragmentary perspective view, diagrammatically shown, of one embodiment of this invention wherein a pair of roller chains carrying respective sets of sawteeth thereon are employed for pulse coding corresponding portions of a projected beam of light.

FIG. 7 is a fragmentary perspective view, diagrammatically shown, of another embodiment of this invention wherein a single projector is used with a pair of roller chains 96 and 98 carrying respective sets of sawteeth 100 and 102 thereon. The sawteeth sets 100 and 102 are, of course, employed for pulse coding corresponding portions of a beam of light. Light from lamp 104 is concentrated on the sawteeth 100 and 102 by a condenser lens 106. The light passing between the sawteeth 100 and 102 can be transmitted through a two-section color filter 108 and then projected by lens 110 which is suitably adjusted to form an image of the sawteeth pattern at infinity. The roller chains 96 and 98 are, of course, endless chains which are positioned approximately parallel to and spaced a predetermined distance from each other.

The filter 108 includes, for example, a red section 108a and a green section 108b. The filter sections 108a and 108b are preferably colored or coated to transmit light of equal intensity so that their viewing (operating) ranges are the same. The light transmitted through the filter 108 provides a sawteeth pattern image 112 having a red lower section 112a and a green upper section 112b. The filter 108 can be adjusted in position to place the dividing line between the colors on the apexes of the lower sawteeth images 112c corresponding to the tips of the sawteeth 102 of the upper chain 98. The upper sawteeth images 112d correspond to the sawteeth 100 of the lower chain 96. Overall reduction of light intensity can be accomplished by reducing the voltage on lamp 104 and/or stopping down the projector lens 110.

In operation, both of the chains 96 and 98 can be driven in the direction indicated by arrow 114. The chain 96 is driven at a speed to produce a frequency of light pulses of about 4 cycles per second, and the chain 98 is driven at a speed to produce a frequency of light pulses of about 2 cycles per second, for example. The chains 96 and 98 can, of course, be driven at the same speed since the filter 108 sections provide adequate identification between the lower and upper sawteeth images 112c and 112d. As the roller chains move in the direction of the arrow 114, the sawteeth images 112c and 112d sweep across the area occupied by an incoming aircraft 116. If the aircraft 116 is in the proper glide path area between the apexes of the projected sawteeth images 112c and 112d, the pilot of the aircraft sees a steady (green) light. When the aircraft moves below or above the glide path area, the ends of the sawteeth images 112c or 112d respectively intersect the aircraft 116 and the light will be temporarily extinguished. As the aircraft 116 moves farther from the glide path area, the light will be extinguished for longer and longer periods until it disappears entirely. The sawteeth waveforms are never visible as such to the pilot, nor is it possible for the pilot to tell in which direction a viewed waveform is moving. Thus, the chains 96 and 98 can be driven in the same direction or in opposite (opposing) directions.

The frequency of the light pulses observed by the pilot depends upon the speed at which the corresponding roller chain is being driven. The color filter 108 need not be used, if so desired, since the roller chains 96 and 98 can be run at different speeds which produce sufficiently distinctive light pulse frequencies to indicate to the pilot whether he is too low or too high. The duration of the light off portion of each period is, of course, dependent upon the distance of the pilot's aircraft from the optimum glidepath. In order to keep his aircraft in the proper glidepath, the pilot maneuvers the aircraft so as to increase the observed pulse width or duration and obtain a steady signal light.

Use of the two-section color filter 108 gives the pilot an additional indication of whether his aircraft is too low or too high from the proper glidepath. Red is favored to indicate that the aircraft is too low. Either green or white can be used for both the too high and correct glidepath indication, or green can be used for a too high indication alone and white can be used for the correct glidepath indication. It will, however, generally be necessary to employ a neutral filter to reduce he intensity of the white light for night landings. It should be made clear hat the addition of any color filter system is a supplement to the basic principle of pulse length modulation and that these devices work well by discriminating two sides of the beam through having one side at one fixed frequency and the other at a higher or lower frequency. However, color additions may be appropriate in some cases; e.g., ship guidance where red for port and green for starboard are recognized and commonly accepted signals.

Figure 8:
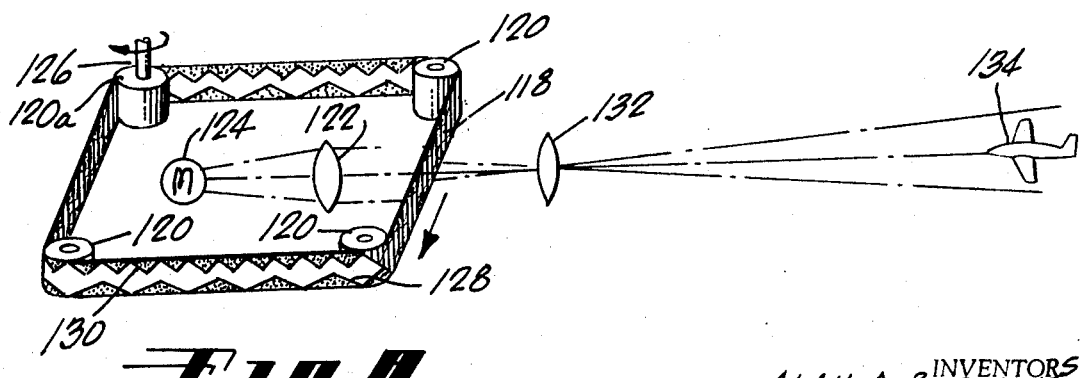
FIG. 8 is a fragmentary and diagrammatic perspective view of another embodiment of the invention wherein a closed loop of film having suitable sawteeth patterns provided thereon is used for performing the pulse coding operation.

FIG. 8 is a fragmentary and diagrammatic perspective view of another embodiment of our invention. A closed loop of film 118 is suitably driven on rollers 120 and moved past condenser lens 122 which condenses the light from a lamp 124 onto a portion of the film. Roller 120a can be driven by shaft 126 and have sprockets (not shown) which engage perforations (also not shown) along the edges of the film 118. Sawtooth patterns 128 and 130 are two sets of opaque sawteeth located respectively on lower and upper sections of the film 118. The sawteeth 128 have a pitch which is, for example, twice that of the sawteeth 130. This, of course, establishes the ratio of the two frequencies of light pulses projected by lens 132 to aircraft 134. An advantage of this embodiment is that color film can be used instead of requiring color filters (or the two-sections color filter 108 of FIG. 7). The film 118 is, however, less durable than a sawtooth chain such as the assembly 74 of FIGS. 4, 5 and 6. Further, in a high power projector, heat filters which absorb a considerable portion of the useful light may be required.

Figure 9:
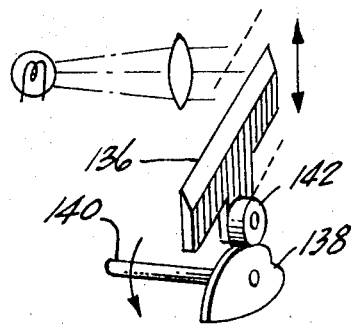
FIG. 9 is a fragmentary and diagrammatic perspective view of a cam-operated shutter device for pulse coding a beam of light.
Figure 10:
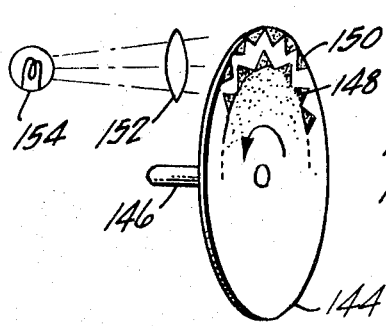
FIG. 10 is a fragmentary and diagrammatic perspective view of a disc having suitable sawteeth patterns provided thereon for performing the pulse coding operation.
Figure 11:
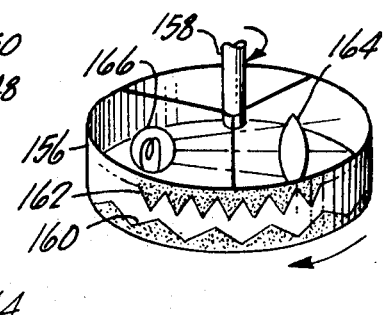
FIG. 11 is a fragmentary and diagrammatic perspective view of a cylindrical shell having suitable wherein patterns provided thereon for performing the pulse coding operation.

FIGS. 9, 10 and 11 show three different means for pulse coding a projected light beam. In FIG. 9, a vertically oscillating shutter or mask 136 is driven by a cam 138 which is mounted on a rotating shaft 140. The shutter 136 can be reciprocated up and down at constant velocity in both directions by the cam 138 which engages cam follower 142 mounted on the shutter 136. The cam 138 can have a symmetrical heart-shaped contour or form which produces a linear rise and fall of the shutter 136 that is of adequate light intercepting length and width. This produces the same pulse coding effect as a symmetrical straight-sided sawtooth on a moving chain. Nonlinear pulse control can be obtained by changing the cam 138 contour or shape to other forms, as may be desired. Of course, other reciprocating mechanisms can be used for linear and nonlinear motions, such as reversing gears, crank arms, linkages, etc. Due to inversion of the image produced by a projector lens, the mechanism shown in FIG. 9 provides pulse coding above the optimum glidepath, and the upper travel limit of the shutter 136 edge defines the upper limit of the proper glidepath area. Thus, in an aircraft at any given distance above the optimum glidepath, the pilot sees light pulses having a duration which is inversely proportional to the distance from such glidepath. To obtain pulse coding above and below the glidepath, two of the mechanisms shown in FIG. 9 must be used as described later.

In FIG. 10, a transparent disc 144 is mounted on a rotatable shaft 146 and includes opaque sawteeth patterns 148 and 150 suitably positioned concentrically thereon. These patterns 148 and 150 produce pulse coding of respective portions of the light beam formed by condenser lens 152 from the light of lamp 154. Similarly, in FIG. 11, a transparent cylindrical shell or drum 156 is mounted to a rotatable shaft 158 and includes opaque sawteeth patterns 160 and 162 provided circumferentially about the cylindrical wall of the drum 156. The patterns 160 and 162 are suitably spaced axially from each other and produce pulse coding of respective portions of the light beam formed by condenser lens 164 from the light of lamp 166. Both of the arrangements of FIGS. 10 and 11 are simple and rugged. They are, however, usually more bulky than the chain or tape embodiments of FIGS. 7 and 8 since, unless made adequately large, the disc 144 can cause a slight vertical distortion of the glidepath while the patterns on the drum 156 cannot be focused quite as accurately as in the other embodiments.

Figure 12:
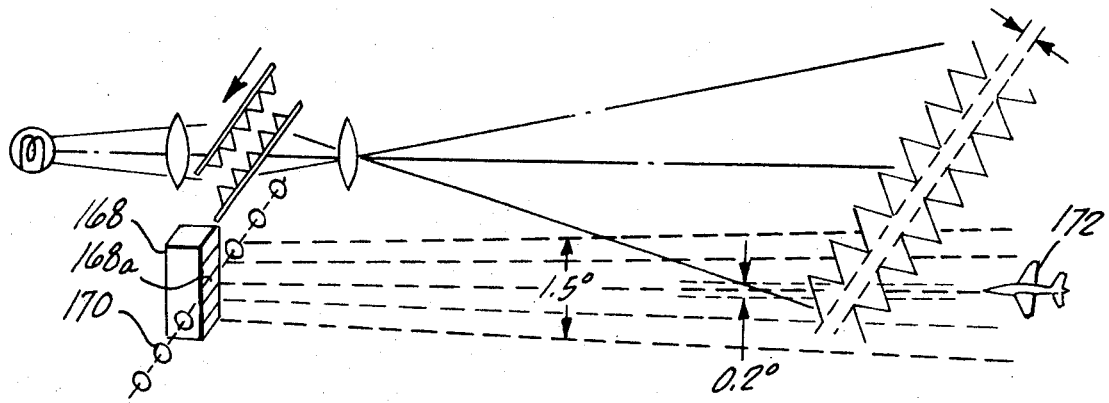
FIG. 12 is a fragmentary and diagrammatic perspective view of an optical guidance arrangement including a pulse code system according to this invention and a Fresnel system which is effective for aircraft guidance only within a predetermined minimum range of the pulse code system.

FIG. 12 is a diagrammatic perspective view of our pulse code system operation in conjunction with the Fresnel lens optical landing system. The Fresnel system is represented by a vertical stack 168 of five lens cells, and a horizontal row of datum lights 170 distributed equally on each side of and in line with the center lens cell 168a. The lens stack 168 is tilted to direct light along the glide path, at an angle (not indicated) of about 3.5° from the horizontal. Light from the lens stack 168 diverges vertically about 1.5°, with the glidepath generally considered to be the center 0.2°. When aircraft 172 is on the glidepath, the pilot will see a ball of light from the center lens cell 168a. If the aircraft 172 is above or below the glide path, the ball of light will be seen in one of the upper or lower lens cells. The ball of light appears to move up or down in the lens stack 168 as the aircraft 172 moves above or below the glide path. The pilot directs the aircraft 172 so that the ball of light is centered in the lens stack 168, in alignment with the adjacent rows of horizontal lights 170 on either side. The position of the ball of light in the lens stack 168 can be seen at distances up to about a mile. When mounted on an aircraft carrier, the lens stack 168 is stabilized by gyrocontrolled servomotors to compensate for roll and pitch of the carrier.

Figure 13:
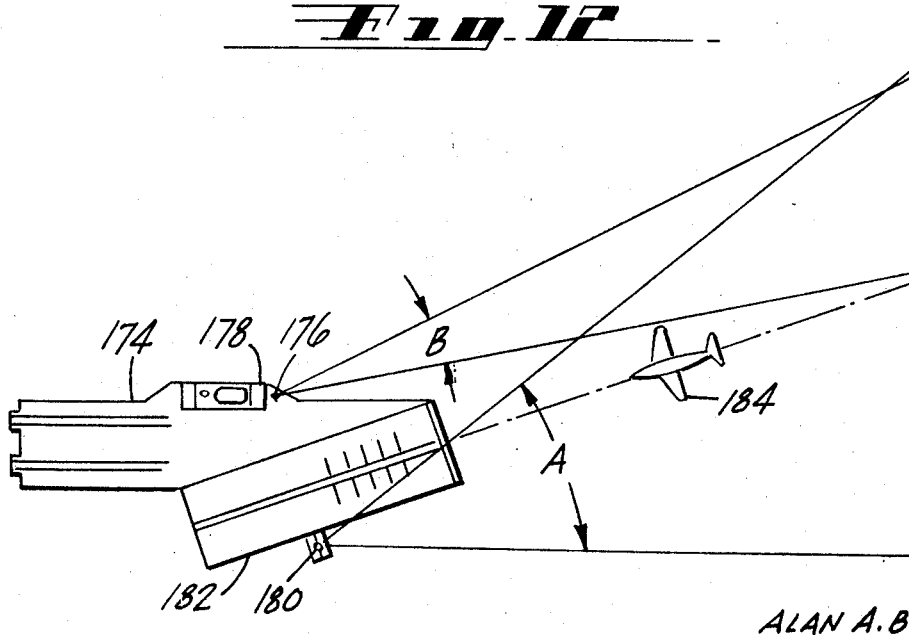
FIG. 13 is a diagrammatic top plan view of an aircraft carrier mounting the optical guidance arrangement of a pulse code system and Fresnel system as shown in FIG. 12.

FIG. 13 is a top plan view of an aircraft carrier 174 mounting a gyrostabilized pulse code system 176 near the bridge 178 and a gyrostabilized Fresnel system 180 outboard of the angled flight deck 182. The beams of light from the Fresnel cells diverge horizontally at an angle A of about 40°, for example. The pulse code system 176 is mounted at the same level as the Fresnel system 180, but is laterally displaced to the other side of the carrier 174. The horizontal angular divergence B of the pulse coded beam is established by the dimensions of the carrier 174 and the range from the carrier at which the pulse coded signals are to be cut off. This will avoid any distracting effect of the high intensity pulse code at close range, and permit the pilot to use the more direct visual guidance of the carrier deck 182 and the Fresnel system 180.

In operation, as aircraft 184 approaches the carrier 174, the pilot ordinarily sees the pulse coded signals before actually seeing any from the Fresnel system, although the Fresnel display may be seen but not interpreted at a distance of several miles. If the path of the aircraft 184 is lined up with the centerline of the angled flight deck 182, the pilot will lose the pulse code signals at the encircled point 186 where the edge of the pulse code pattern intersects the centerline of the angled flight deck. The pilot then uses the fresnel system 180 for guidance until he can clearly see the flight deck 186.

Test flights using the combination of Fresnel and pulse code systems as indicated in FIG. 13, showed that smooth transition from the pulse code signals to the Fresnel signals was obtained at distances ranging from about a third of a mile to one mile. The pilots were able to get established on the glide path before reaching the 1 mile range of the Fresnel system. Pulse code acquisition was generally reported at distances of 6 or 7 miles and, in full sunlight, ranged from a minimum of about 5 miles to a maximum of over 10 miles. When flying into and out of the pulsed beam, the pilot was able to determine his position in the beam on either lateral or vertical reentry into the beam, by the pulse duration and color, where color rather than frequency identification of two sides of the beam was used.

Night flights in general required reduction of the projected light intensity to less than 10 percent of the value used in daytime flights, in order to avoid glare and difficulty in transition to the Fresnel signals. The change in light intensity reduced the nighttime acquisition range to about the daytime minimum range of 5 miles, which was considered quite adequate.

Flight tests were also made with the pulse code system used independently of the Fresnel system, adjacent to the runway of a commercial airfield. Satisfactory operation was obtained with the aircraft moving out of the pulsed beam at about ¼ to 1 mile from touchdown, depending on the lateral displacement of the projector from the runway and its angle with respect to the runway. The glide slope angle was set at 2.5°, in agreement with the glide slope established by the short wave instrument landing system (ILS). It was found that the pulse light signals could be used as a backup landing aid during failure of the ILS equipment on the aircraft, though this is possible only when visibility permits.

Tests of the resolution and color definition (when color supplement was used) of the pulse coded beam were made by observers stationed at a distance of 2 miles from the projector. With the upper portion of the beam coded white and the lower portion red, the color distinction was detected with a change in the height of observation of about 2 feet. The white for high and red for low color code is apparently favored by the pilots, since it gives a sharply defined and instantaneously interpreted signal. There is a tendency in favor of using the same frequency for both high and low indications. Quantitative estimation of aircraft deviation above or below the glide path may be easier when the frequencies are the same. The favored value of frequency seems to be between 3 and 6 cycles per second, which is high enough to avoid a lag in interpretation and low enough to avoid undesirable psychophysical effects. These may occur in some individuals when subjected to light flashes somewhat above this range of frequency. However, when observing distant signals for a relatively short time, the low intensity and short duration of the higher frequency signal flashes are not likely to cause any significant disturbing effects on the pilot.

FIG. 14 illustrates an alternate arrangement for combining the pulse code and the Fresnel systems. Two pulse code projectors 188 and 190 are used, one attached near the bottom of the Fresnel lens stack 192, and the other near the top. Since the projectors 188 and 190 are comparatively small and compact, they can be stabilized by attaching them to the Fresnel lens stack 192. The masks 194 and 196 are placed respectively adjacent to the tips of the sawteeth sets 198 and 200, to define one edge of each projected beam of light. Color filters 202 and 204 may be used if desired.

The projectors 188 and 190 are mounted and oriented so that the lower edge of the pulsed beam from the upper projector coincides with the upper edge of the Fresnel beam, and the upper edge of the pulsed beam from the lower projector coincides with the lower edge of the Fresnel beam. With this arrangement, pulsed light is never visible within the fresnel beam. As the aircraft 206 approaches the glide path, the pilot sees first the short duration pulses which gradually increase in duration to steady light. On transition to the Fresnel beam, the steady light goes out. No overlap of the pulse code beams with the Fresnel beam is allowable, as the Fresnel beam would be obscured by the nearly full-time duration of the pulsed light signals produced by either of the projected sawtooth images 208 and 210 overlapping the Fresnel light pattern or beam.

FIG. 15 shows another optical guidance arrangement which is similar to that of FIG. 14, except that the sawteeth sets 212 and 214 are reversed and point toward the Fresnel beam. Masks 216 and 218 are of course, placed respectively adjacent to the tips of the sawteeth sets 212 and 214. On approach to the glide path, the pilot of aircraft 220 sees first the pulsed signal at its maximum duration which will gradually diminish to zero as he reaches the Fresnel beam, and the ball of light comes into view. This arrangement, with the sawteeth sets 212 and 214 pointing toward each other, will permit some overlap of the sawteeth images 222 and 224 with the Fresnel beam, without much obscuration, since the pulsed signals are of short duration at the tips of the sawteeth images. The intensity of the light at the tips of the sawteeth images 222 and 224 can be diminished by various means such as variably transmissive color filters 226 and 228 which gradually reduce the light intensity towards the tips. Changing the projected sawtooth waveform to a more pointed shape will have a similar effect by giving a shorter duration of flash near the tips. These modifications permit greater overlap of the pulse code and Fresnel systems.

Depending on the effects of blending the Fresnel and the pulse code signals, there are various adjustments that can be made. One setup is to maintain the vertical spacing of the pulse code projectors, but to tilt them so as to provide beams which converge with the Fresnel beam. The tips of the projected sawteeth can further be made to diverge any desired amount, or even to remain parallel rather than converge to a point. This would define a glidepath with a constant vertical height or spacing equal to the distance between the two projectors, and the pulse signals are each of a minimum and definitely perceptible duration. If blending of the pulse code and Fresnel displays is employed, a favorable arrangement is to maintain fairly large vertical separation of the pulse code projectors at the Fresnel lens stack, giving some convergence of the pulse code beams with the Fresnel beam. There appears to be some advantage in reinforcing any high ball or low ball Fresnel indication by the coded flash, provided that observation of the ball is not obscured by the flash. Also, the vertical spacing between the projectors can be modified to make the tips of the pulsed light beams contiguous with the upper and lower edges of the second and fourth Fresnel cells, respectively, rather than those of the top and the bottom cells, is another adjustment that can be made.

Figure 16:
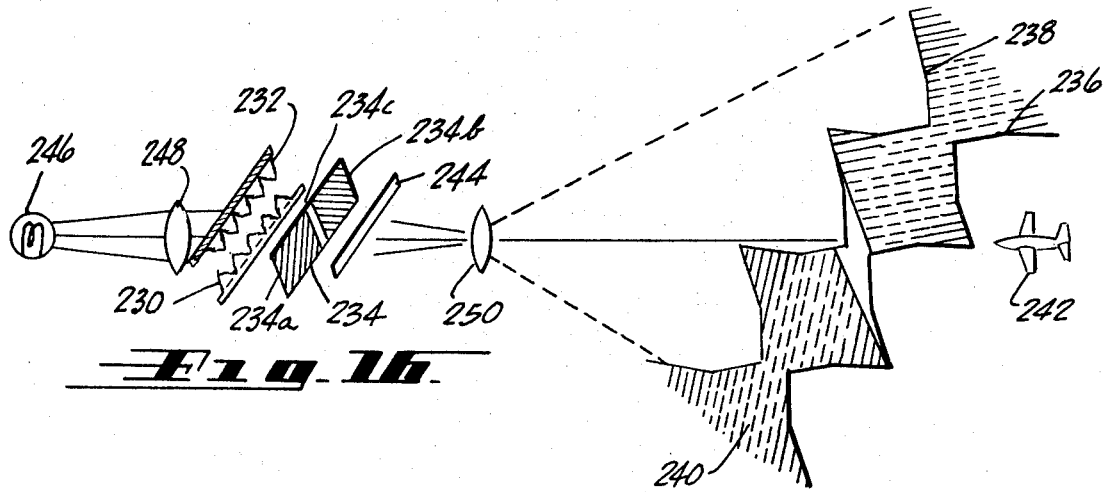
FIG. 16 is a fragmentary and diagrammatic perspective view of a pulse code system which provides greater and more refined guidance information for landing an aircraft.

FIG. 16 illustrates an embodiment of this invention which is similar to that shown in FIG. 7. Blunted sawteeth sets 230 and 232, however, are used instead of linear slope sawteeth 100 and 102 (FIG. 7). In addition, the two-section color filter 234 is different from the two-section color filter 108 (FIG. 7) in that it has two laterally disposed areas 234a and 234b of different colors, with a clear area 234c between them. It is placed as close as possible to the sawteeth sets 230 and 232 so as to achieve sharp color distinction in the projected images 236 and 238. This causes the left and right halves of the projected sawtooth images 236 and 238 to be of different colors with an intervening clear strip therebetween, as shown in the enlarged image pattern 240. The pilot of an aircraft 242 flying into this pattern 240 can, therefore, determine whether he is to the right or the left of the runway centerline by the color of the pulse coded signals, produced by the colored areas 234a and 234b of the filter 108. The signals will appear in white light when the aircraft 242 is aligned with the runway centerline. The pilot can also determine if he is above or below the glidepath by the difference in pulse frequency above and below the glidepath. The use of four different colors in the four quadrants of the flight image pattern appears impractical, since flight tests have shown that color differences show considerable loss of distinction at long range.

As the aircraft 242 approaches a pulse coded projector, the light intensity may become uncomfortably bright at close range. A shadow bar 244 can be used to reduce the light intensity in the glidepath. The bar 244 is placed in the beam of light from lamp 246 as condensed by lens 248, out of focus of projector lens 250. Proper selection of the size and location of this bar 244 will cause a horizontal shadow of adjustable size and controlled graduation of intensity to appear on the pattern 240, giving a suitable intensity of light in the glidepath and controlled graduation to full intensity adjacent the bases of sawteeth images 236 and 238. This is indicated in the image pattern 240 by transition of the oblique hatching from dotted lines to full lines.

The overall (enlarged) image pattern 240 of the sawtooth waveforms shows that the rate of change of pulse width is more rapid near the sawteeth tips when a blunted sawtooth waveform is used. In other words, with a given small displacement from the glide path, the change in pulse width is greater with a blunted sawtooth than with a linear sawtooth, near the tips. This gives greater sensitivity where it is required near the glide path. When the pulse code signal is first acquired by the descending aircraft 242, it will be with light at the bases of the sawteeth image 238 and which is at full intensity. Acquisition range thus is not reduced. A reduction in intensity is made later when the pilot has maneuvered closer to the glide path; however, he will also have reduced his range and does not require full intensity light. The shadow bar 244 may therefore be used to advantage to reduce glare at close range without any reduction in the range at which the pulse code signal is first acquired. The descending aircraft 242 thus encounters the short duration but more intense pulses when a discernable signal pattern is first acquired.

Figure 17:
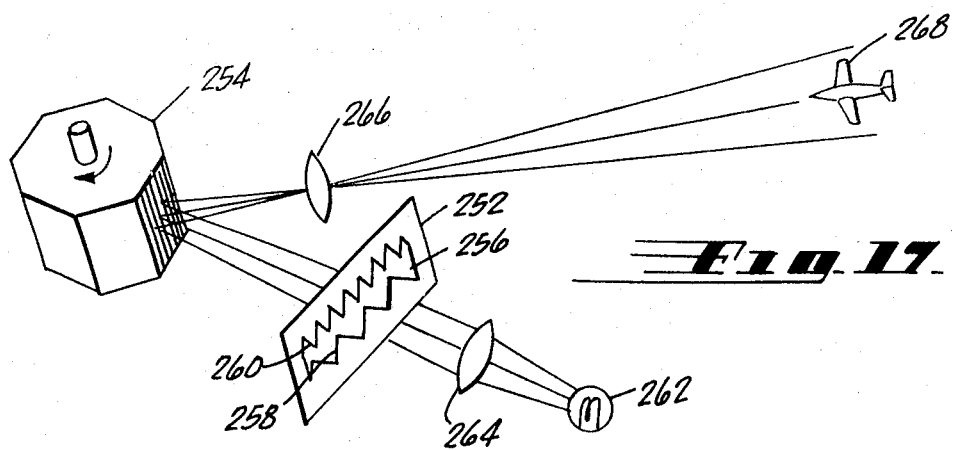
FIG. 17 is a fragmentary and diagrammatic perspective view of a pulse code system including stationary sawteeth patterns used in conjunction with a rotating mirror drum to code different portions of a projected light beam.

FIG. 17 shows an arrangement for producing pulse coded signals by use of a stationary sawtooth template 252 and a rotating mirror drum 254. The sawtooth template 252 includes a sawtooth pattern aperture 256 formed by a pair of opposed sets of sawteeth 258 and 260 of different pitch. Light from lamp 262 and condenser lens 264 passes through the aperture 256 and falls upon the mirror drum 254. As the drum 254 rotates, this light will be deflected before reaching the projector lens 266. By choosing the pitch of each of the sawteeth sets 258 and 260 and angle between the mirror facets on the drum 254 properly, rotation of the drum will cause the projected sawtooth images to sweep by the aircraft 268 without any discontinuity in the sawtooth waveforms. In other words, adjacent facets of the mirror drum 254 must produce exactly overlapping or contiguous projected waveforms. This arrangement is limited to the projection of pulse frequencies which are exact multiples of each other, if the projected sawtooth waveforms are to be continuous.

Figure 18:
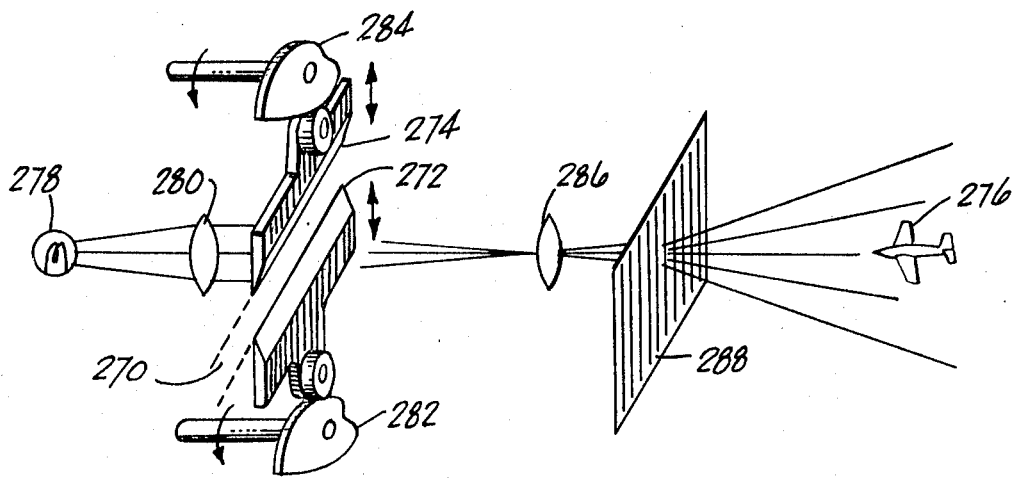
FIG. 18 is a fragmentary and diagrammatic perspective view of a pulse code system including a pair of cam-operated shutter devices for coding different portions of a projected light beam.

FIG. 18 shows two of the mechanisms of FIG. 9 vertically aligned to each other so as to define a slot 270 between the opposing shutters 272 and 274. As the shutters 272 and 274 are vertically reciprocated, so is the width of the slot 270 between shutter edges varied. The minimum slot width defines the glide path for the aircraft 276 since light from lamp 278 and condenser lens 280 is never intercepted in this area. The shutters 272 and 274 are driven by cams 282 and 284, respectively, at different speeds to produce the desired pulse frequencies. At any given vertical distance from the glidepath, the light will be cut off for a period which is dependent on the distance from the glidepath. After passing through projector lens 286, the light passes through a lenticular lens 288. This lens 288 has a series of vertical ribs which spread the light in a horizontal plane but do not cause any vertical deflection. The lens 288 is used when it is desired to increase the horizontal spread of the pulse code signals. However, its use is limited to applications using oscillating shutters to generate the pulse code signals. It cannot be used with a moving sawtooth waveform, since the waveform will be dispersed. The lenticular lens 288 can be differently colored in lower and upper sections of a horizontal pattern when it is desired to color code the pulses above and below the glide path.

FIG. 19 is a fragmentary and diagrammatic perspective view of a pulse code system including a cam-operated shutter plate 290 mounted on a parallelogram support structure 292. The structure 292 includes a vertical and stationary bar 294 and two arms 296 pivoted on the bar. The shutter 290 is pivotably mounted on the arms 296. A rectangular aperture 298 is located within the shutter 290 and through which light from lamp 300 and condenser lens 302 passes to fall upon a projector lens 304. A suitably mounted, stationary color filter 306, preferably red in color, is positioned closely adjacent to the shutter plate 290, overlapping part of the aperture 298 therein. A cam follower 308 is attached to the lower portion of the shutter 290, and is driven by a heart-shaped cam 310 which can be designed to produce a rise and fall of the shutter 290 that is proportional to the rotation of the cam. A pair of vertical guide rails can, of course, be used in place of the structure 292 to support and guide the shutter 290 along its sides.

As the shutter 290 rises and falls, the vertically oscillating image pattern 312 of the aperture 298 is projected into space by the lens 304. The amplitude of the shutter oscillation and the vertical span of the shutter aperture 298 are chosen so that a narrow band of light directly beneath the lower edge of the stationary color filter 306 is never cut off by motion of the shutter 290. The steady white light projected through this band defines the glide path shown as the central clear area 312a in the image pattern 312. The lower edge of the color filter 306 is located at the lower limit of motion of the upper edge of the shutter aperture 298. Thus, as the shutter 290 oscillates, the area 312b beneath the glidepath is defined by a flashing red light, with the pulse duration of the light projected on aircraft 314 dependent upon the angular deviation (departure) of the aircraft from the glidepath. The area 312c above the glidepath 312a is similarly defined by a flashing white light. The shutter 290 and its aperture image 312 are shown at the midpoint of their oscillatory movements. As the shutter 290 moves to its lower limit of motion, the area 312b 312c are, of course, respectively widened and narrowed in a similar manner as the shutter 290 moves to its upper limit of motion.

This arrangement permits a simple design in any application where the same pulse frequency is used above and below the glidepath. Further simplification can be obtained by replacement of the cam 310 by an eccentric or crank arm drive, but this produces a sinusoidal motion of the shutter 290, resulting in considerably lower velocity of the shutter near its lower and upper limits of motion. This gives increased sensitivity in pulse variation as a function of aircraft deviation from the glidepath near the lower and upper edges of both the red and white pulse coded areas 312b and 312c. However, flight tests indicate that sinusoidal motion appears to give too great an increase in sensitivity in these areas, though some increase may be desirable, as explained with reference to FIG. 16 where increased sensitivity is provided near the glidepath only. Substitution of properly designed cams with suitable contours can provide a range of variation in sensitivity near the extremes of shutter motion.

Pulse code equipment designed for use by helicopters and vertical takeoff and landing aircraft will involve considerable variation in the values of glide slope angle and in the vertical span of the pulsed light beam, although the value of glide slope angle selected for helicopters if often not much greater than the angle used by fixed wing aircraft. When a pulsed light beam of large vertical span is used with a relatively low glide slope angle the lower edge of the beam can strike ground level which is not desirable.

Flight tests tests were made by helicopters where this occurred, and resulted in the pulsed red light being reflected from snow on the ground, with a tendency to obscure the steady white or pulsed white light when the helicopter was on or above the glide path. In addition, when this occurs, heliports could be easily located by the enemy during military operations since the acquisition range of pulse coded light at night can be 20 miles or more. One solution is to employ a horizontal ground signal mask, located above and near the plane of the moving sawteeth or shutter. This mask can be lowered when required to cut off any signals from appearing at ground level. A more satisfactory solution is to design the equipment for a smaller pulse code span below the glidepath. Where moving sawteeth are used, this means that the sawteeth defining the lower pulse coded beam must be shorter than the sawteeth defining the upper beam. When vertically moving shutters are used, the upper shutter edge must move a shorter distance. This can be accomplished with the mechanism of FIG. 18, using suitably dimensioned drive cams 282 and 284, for example.

FIG. 20 shows a pulse code system including two cam-operated shutters 316 and 318 mounted on a double parallelogram support structure 320. The structure 320 includes a stationary vertical bar 322, two arms 324 pivoted on the bar, an upper L-shaped shutter member 318 attached to and pivoted at intermediate points on both arms, and a lower L-shaped shutter member 316 attached to and pivoted on the movable ends of the two arms. A cam follower 326 is attached to the lower shutter member 316 and is driven by heart-shaped cam 328. As the double parallelogram structure 320 is vertically reciprocated by the cam 328, the lower shutter member 316 will travel a greater vertical distance than the upper shutter member 318, since its pivot points on the arms 324 are at a greater distance from the stationary vertical bar 322 than the pivot points of the upper shutter member. A stationary color filter 330 is placed closely adjacent to the plane of the shutters 316 and 318, overlapping part of the space between the opposing shutter edges. Projector lens 332 thus projects a vertically oscillating beam whose lower edge has less amplitude of movement that the upper edge of the beam.

FIG. 21 shows a pulse code system which is similar in construction and operation to that of FIG. 19, except that it provides horizontal guidance instead of vertical. Parallelogram support structure 334 includes arms 336 which are pivoted at their lower ends to a fixed horizontal bar 338 and pivoted at their upper ends to shutter plate 340. The shutter plate 340 has a rectangular aperture 342, and a cam follower 344 is attached to one side of the shutter plate. The shutter 340 is oscillated in a horizontal direction by the heart-shaped cam 346. Two stationary color filters 348 and 350 of red and green, for example, are positioned adjacent to the oscillating shutter 340. A narrow vertical space or slot 352 between filters 348 and 350 defines a fixed vertical plane through the center of the assembly. Movement limits of the shutter plate 340 and the horizOntal span dimension of its aperture 342 are chosen so that at the two extremes of shutter motion, the vertical edges of the shutter aperture alternately coincide with a corresponding one of the adjacent and opposing edges of the color filters 348 and 350. This produces complete modulation of light passing through both color filters 348 and 350, and leaves a narrow vertical beam of steady white light projected by the lamp 354 and condenser lens 356 through the vertical slot 352 and to the projector lens 358. It is evident from the description of the preceding system of FIG. 19 that an observer in the pulse coded beam 360 will see steady white light in the central area 360a of the beam, and flashing red or green in the areas 360b and 360c on either side. The flash duration increases towards steady light as the observer approaches the center beam area 360a, where it changes suddenly to steady and clear white light. Slight changes in the position of the color filters will produce steady narrow vertical beam areas of red and green on either side of the white beam, if so desired.

The beam area 360a may be directed at a harbor entrance, as established by two breakwaters 362a and 362b, or may be used to define a safe passage in shallow water or between underwater obstructions with considerably accuracy. Tests, for example, with the experimental setup of FIGS. 1 through 3 showed a color definition of about 1 or 2 feet per mile of range, which indicates the transitional movement required from one color area into another to observe or see a sharp or complete change in color. Similar guidance may be established for land vehicles, such as tanks, either toward or away from a beam projector.

In many applications of the invention it may be desirable to have the pulse coded beam extend over a wide angular span. As described with reference to FIG. 18, a lenticular lens may be used to spread a pulse coded beam over a wide angle, when the pulse coding is generated by a moving shutter rather than by moving sawteeth. However, dispersing the light over a wider angle necessarily reduces its intensity and the range at which it can be observed. Other variations in the optical design of the projector may be used to increase the light intensity when a large angular span is used, without employing a lenticular lens.

FIG. 22 is a diagrammatic top plan view of a projector design which employs a number of light generating modules 364 each having a separate lamp 366 and condenser lens 368. Each module 364 is oriented so that its light passes through a light modulating device 370 and falls upon the projector lens 372. The light modulating device 370 can be any form of moving sawtooth device, such as shown in FIGS. 7, 10, 11 or 17, or a moving shutter device as illustrated in FIGS. 9, 18, 19 or 20. The object of orienting the lamp and condenser modules 364 in the manner shown is to concentrate as much light as possible uniformly along the length of the light modulator 370.

After the light has passed through the modulator 370, lit tends to converge and then diverge so that substantially all of it falls upon and fills the projector lens 372. In this manner, the light modulator 370 is fully illuminated and the projector lens 372 receives all the modulated light to form a pulse coded beam of maximum intensity and range. The desired angular span of the projected beam of light will, of course, influence the number of light generating modules 364 to be employed, as well as the design and arrangement of the modulator 370 and the projector lens 372.

FIG. 23 is a diagrammatic top plan view illustrating a design which employs a number of separate projector lenses to obtain an unlimited angular span of the pulse coded beam of light. Light source 374 can be a gasoline lantern having an incandescent mantle 376. Light from the mantle 376 shines upon an arcuate cylindrical condenser lens 378 which, in addition to being a segment of a cylinder, is also bent or curved as shown so that the mantle 376 is at the center of its radius of curvature. The purpose of this lens 378 is to make light from the mantle 376 converge vertically on light modulator 380. This modulator 380 can be the rotating sawtooth drum shown in FIG. 11. The modulator 380 is indicated in FIG. 23 in phantom lines as it would appear when viewed along its axis of rotation. A series of projector lenses 382 is arranged in a circle concentric with the mantel 376 and the light modulator 380. A moving sawtooth pattern is formed by each of the projector lenses 382. By adjusting the angular position or circumferential spacing relation of each lens 382 with respect to its adjacent lenses, these sawtooth patterns can be made to overlap smoothly or combine accurately into a single unambiguous pattern. The number of lenses 382 that can be used is not limited and may be extended to form a complete circle, giving pulse coded signals over 360°.

FIG. 24 is a cross-sectional view of the lens 378 as taken along the line 24—24 indicated in FIG. 23. The light modulator 380 used with lens 378 is, of course, not limited to the sawtooth pattern drum of FIG. 11. An oscillating shutter arrangement can also be used, where the shutter takes the form of a vertical section of a drum which is not rotated, but is oscillated in an axial direction, with the light transmitted radially through a circumferential clear band in the middle of the drum section. This arrangement is basically similar to that shown in FIG. 19, with the shutter plate 290 curved cylindrically about a vertical axis passing through the light source 300. It is not necessary to adjust the angular position or spacing between lenses 382 when an oscillating shutter is used instead of laterally moving sawteeth.

FIG. 25 shows a gyrocontrolled optical system which can be used with the pulse code system mounted on, for example, an aircraft carrier. The arrangement shown can be employed where it desired to introduce corrective angular motions for the effects of roll and pitch of the carrier on the pulse coded beam of light, without the necessity of stabilizing the entire equipment. The pulse coded or modulated beam of light 382 passes through a projector lens 384 which can be any one of the projector lenses previously described. It will next pass through dove prism 386 which rotates the beam of light 382 and, hence, the image therein through an angle dependent on the angular position of the dove prism. After emerging from dove prism 386, it passes through a wedge prism 388 where it is deflected up or down at an angle dependent on the angular position of the wedge prism. For large angular deflections, a suitably mounted mirror may be preferred instead of the prism 388.

The dove prism 386 is axially mounted within a ring gear 390 which is driven by pinion 392 attached to the output shaft of servomotor 394. This motor 394 is controlled by signals from the gyrostabilized reference means 396 which transmits corrective roll signals over the cable 398. Wedge prism 388 is mounted on the shaft of changes) 400 which likewise receives corrective pitch signals from the reference means 396. The beam of light 382 is thereby stabilized against both roll and pitch of the ship on which the pulse light equipment is mounted. The gyrostabilized reference means 396 is conventional and can be similar to that used to stabilize the direction of the guns of a battleship. The reference means 396 includes gyro means for establishing a fixed vertical, and suitably oriented and mounted sensors for measuring the angular deviations of the carrier from the fixed vertical and provide corrective signals for the servomotors 394 and 400 to maintain the projected direction of the beam 382.

It is evident that mirrors or other types of prisms may be substituted for the prisms 386 and 388. Other corrective motions related to yaw and heave of the carrier can also be introduced, either by additional light deflecting elements, or by modifying the angular inputs to prisms 386 and 388.

While the above description has included various exemplary configurations and arrangements of the present invention, other devices may be used to modulate or code a beam of light in a manner which will quantitatively indicate deviation from a given position in the beam, by variable time interruption of the light within specific areas (with or without color changes of the beam. Further, automatic guidance by servo control can be obtained using a pulse code projector operating as described with respect to FIG. 7, with photoelectric pickups and control circuits in the vehicle, responsive to frequency and pulse duration. It is, however, preferably to increase the pulse frequencies for this type of application. By using two separate projectors with independent lamps (as in FIGS. 14 or 15), their light can be readily modulated respectively at different frequencies well above visual perception, and superimposed on the pulse code signals. Photoelectric pickups with appropriate filters in the vehicle can easily detect the modulated light when ambient light makes it quite invisible. This may be used either for audible pulse code detection or servocontrol of an aircraft (or missile) by pulse code to govern its motion in any horizontal or vertical plane.

A still further modification of this invention is to introduce infrared or ultraviolet filters (or sources) to a noncolor supplemented device (i.e., a device providing a beam having side portions distinguished by different pulse frequencies), and supplying the vehicular observer with an intensifying device so that only he or another observer supplied with such a device can detect and use the transmitted signal. These infrared or ultraviolet beams would be particularly useful where attention by others to a light beam is not desired.

Another modification of the invention is to introduce a second modulation of the projected signal by introducing before the projector lens, for example, a rotating transparent disc inscribed with opaque segments or sectors, this causing a secondary modulation of the beam at high frequency (say, 200

Hz.) which is indistinguishable by the human eye. The regular low frequency modulated light portions of the beam will then be still usable by a vehicular observer, but the secondary transmission can also be picked up by photosensitive means in the vehicle tuned to the secondary frequency, the major low frequency components being derived by demodulation and used to provide on-board display or automatic guidance and control to the vehicular control system.

Thus, while certain particular embodiments of the invention have been described above and shown in the accompanying drawings, it is to be understood that such embodiments are merely illustrative of, and not restrictive on, our broad invention and that various changes in design, structure and arrangement may be made therein without departing from the spirit and scope of this invention.

I claim:

1. In a vehicle guidance system wherein a vehicle is directed along a beam of light that establishes the proper path to a selected area, a method of coding said beam and which comprises the steps of:

projecting a beam of light for establishing said path along which said vehicle is guided; and pulse coding at least a cross-sectional portion of said beam over its projected length whereby a pulse coded signal is encountered by said vehicle following said beam on any departure into the pulse coded portion thereof, said pulse coded signal including periodic pulses having a pulse duration in each period varying continuously according to the degree of departure by said vehicle into the pulse coded portion of said beam.

2. A vehicle guidance system comprising:

means for projecting a beam of light along which a vehicle is guided; and means for pulse coding at least a cross-sectional portion of said beam over its projected length whereby a pulse coded signal is encountered by said vehicle following said beam on any departure into the pulse coded portion thereof, said pulse coded signal including periodic pulses having a pulse duration in each period varying continuously according to the degree of departure by said vehicle into the pulse coded portion of said beam.

3. The invention as defined in claim 2 further comprising means for color coding the cross-sectional portion of said beam.

4. The invention as defined in claim 2 further comprising gyrostabilized reference means, and optical means responsive to signals from said reference means to control the projected direction of said beam, said optical means including means for rotating said beam on its axis and means for deflecting said beam angularly in a plane containing said axis.

5. The invention as defined in claim 2 wherein said pulse coding means includes a stationary sawteeth pattern disposed to intercept a cross-sectional portion of said beam, and means for producing in the cross-sectional portion of said beam over its projected length a moving sawteeth image from said pattern.

6. The invention as defined in claim 2 wherein said pulse coding means includes shutter means disposed to intercept a cross-sectional portion of said beam, and means for reciprocating said shutter means a predetermined amount over the cross-sectional portion of said beam.

7. The invention as defined in claim 2 wherein said pulse coding means includes a set of sawteeth disposed to intersect cross-sectionally a portion of said beam, and means for moving said sawteeth transversely across said beam.

8. The invention as defined in claim 2 wherein said pulse coding means codes normally lower and upper cross-sectional portions of said beam over its projected length whereby pulse coded signals are encountered by said vehicle following said beam on any departure into the pulse coded portions thereof.

9. The invention as defined in claim 7 wherein said sawteeth each has a triangular form with sides each having a linear slope.

10. The invention as defined in claim 7 wherein said sawteeth each has a blunted triangular form with sides each having a complex slope.

11. The invention as defined in claim 8 wherein said pulse coding means includes first and second shutter means disposed to intercept the normally lower and upper portions of said beam, respectively, and means for reciprocating said first and second shutter means a predetermined amount over their corresponding lower and upper portions of said beam.

12. The invention as defined in claim 8 wherein said pulse coding means includes first and second sets of sawteeth disposed to intersect cross-sectionally the normally lower and upper portions of said beam, respectively, and means for moving said sawteeth sets transversely across said beam.

13. The invention as defined in claim 11 wherein said first and second shutter means are reciprocated at different frequencies.

14. The invention as defined in claim 11 wherein said first and second shutter means are reciprocated at different amplitudes.

15. The invention as defined in claim 11 further comprising means for color coding at least one of the cross-sectional portions of said beam, and wherein said first and second shutter means are reciprocated at the same frequency.

16. The invention as defined in claim 15 wherein said first and second shutter means are reciprocated at different amplitudes.

17. The invention as defined in claim 2 further comprising a Fresnel lens optical guidance system cooperatively disposed with respect to said pulse coded vehicle guidance system, said pulse coded system providing relatively distant range guidance of said vehicle and said Fresnel system providing relatively close range guidance thereof.

* * * * *

PO-1050
(5/69)

UNITED STATES PATENT OFFICE
CERTIFICATE OF CORRECTION

Patent No. 3,648,229          Dated March 7, 1972

Inventor(s) Alan A. Burrows and Henry C. Lehde

It is certified that error appears in the above-identified patent and that said Letters Patent are hereby corrected as shown below:

Column 2, line 26, "while" should read -- white --.
Column 3, line 42, "wherein" should read -- sawteeth --.
Column 6, line 33, "he" should read -- the --; line 34,
"hat" should read -- that --. Column 11, line 41, "area
312b" should read -- areas 312b and 312c are respectively
narrowed and widened to reach the lower and upper limits
of the image pattern 312. The areas 312b and --. Column 12,
line 52, "horizOntal" should read -- horizontal --. Column 13,
line 29, "lit" should read -- it --. Column 14, line 23,
"changes)" should read -- servomotor --; line 46, a closing
parenthesis -- ) -- should be inserted after the word "changes"

Signed and sealed this 1st day of August 1972.

(SEAL)
Attest:

EDWARD M. FLETCHER, JR.       ROBERT GOTTSCHALK
Attesting Officer             Commissioner of Patents